US008480793B2

(12) United States Patent
Yeganeh et al.

(10) Patent No.: US 8,480,793 B2
(45) Date of Patent: Jul. 9, 2013

(54) METHOD AND APPARATUS FOR REMOVING CONTAMINANT FROM FLUID

(75) Inventors: Mohsen S. Yeganeh, Hillsborough, NJ (US); Bhupender S. Minhas, Bridgewater, NJ (US); Harry W. Deckman, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 232 days.

(21) Appl. No.: 12/882,332

(22) Filed: Sep. 15, 2010

(65) Prior Publication Data
US 2012/0063981 A1 Mar. 15, 2012

(51) Int. Cl.
*B01D 53/04* (2006.01)

(52) U.S. Cl.
USPC .................. 95/136; 95/148; 96/154; 423/230

(58) Field of Classification Search
USPC ....... 95/136, 148, 900; 96/108, 154; 423/230, 423/622; 585/820
See application file for complete search history.

(56) References Cited

U.S. PATENT DOCUMENTS

| | | | | |
|---|---|---|---|---|
| 3,664,095 | A * | 5/1972 | Asker et al. ..................... | 96/154 |
| 4,391,616 | A * | 7/1983 | Imamura ........................... | 95/92 |
| 5,494,880 | A | 2/1996 | Siriwardane | |
| 5,837,275 | A | 11/1998 | Burrell et al. | |
| 6,352,578 | B1 * | 3/2002 | Sakata et al. ..................... | 96/134 |
| 6,653,519 | B2 * | 11/2003 | Koper et al. .................. | 588/313 |
| 6,710,515 | B2 | 3/2004 | Lu et al. | |
| 6,860,924 | B2 * | 3/2005 | Rajagopalan et al. .......... | 96/154 |
| 7,326,280 | B2 * | 2/2008 | Hrycak et al. .................. | 96/108 |
| 7,704,305 | B2 * | 4/2010 | Nishida ........................... | 96/154 |
| 7,833,316 | B2 * | 11/2010 | Tatarchuck et al. ............. | 95/135 |
| 8,211,218 | B2 * | 7/2012 | Dallas et al. ..................... | 96/154 |
| 2004/0118287 | A1 | 6/2004 | Jaffe et al. | |
| 2008/0308262 | A1 | 12/2008 | Sauer et al. | |
| 2009/0114093 | A1 | 5/2009 | Li et al. | |

FOREIGN PATENT DOCUMENTS

| | | |
|---|---|---|
| CN | 101377069 A | 3/2009 |
| EP | 2053335 A1 | 4/2009 |
| JP | 2007022851 A | 2/2007 |

OTHER PUBLICATIONS

International Search Report, PCT/US2011/051380, mailed Dec. 22, 2011.
Written Opinion, PCT/US2011/051380, mailed Dec. 22, 2011.
Goswamee et al., "Sol-Gel Derived Nanocomposites and Nanoporous Oxide Powders and Related Coatings for the Reversible Chemisorption of Hydrogen Sulfide", Feb. 2004, Journal of Sol-Gel Science and Technology, vol. 29, NR 2, pp. 97-105.
Naszalyi et al., "Sol-Gel-Derived Mesoporous SiO2/ZnO Active Coating and Development of Multifunctional Ceramic Membranes", Feb. 2008, Separation and Purification Technology Elsevier Science, vol. 59, No. 3, pp. 304-309.

(Continued)

*Primary Examiner* — Frank Lawrence, Jr.
(74) *Attorney, Agent, or Firm* — Glenn T. Barrett; Malcolm D. Keen

(57) ABSTRACT

Methods, apparatus, and systems for removing contaminant in a fluid (e.g., chemical and petrochemical gas streams) using nanostructures of a sorbent material coated on plates such as a silicon wafer. A plurality of such coated plates can be assembled to form a sorption structure having channels between the plates. When a fluid containing the contaminant is directed through the channels, the contaminant is adsorbed by the nanostructures of the sorbent material.

32 Claims, 3 Drawing Sheets

OTHER PUBLICATIONS

Lee et al., "Desulfurization Using ZnO Nanostructure Prepared by Matrix Assisted Method", Korean J. Chem. Eng., vol. 26, No. 2, pp. 582-586, (2009).

Wang et al., "Low-Tempurature H2S Removal From Gas Streams With SBA-15 Supported ZnO Nanoparticles", Chem. Eng. J., vol. 142, pp. 48-55 (2008).

Sayyadnejad et al., "Removal of Hydrogen Sulfide by Zinc Oxide Nanoparticles in Drilling Fluid", Int. J. Environ. Sci. Tech., vol. 5, No. 4, pp. 565-569 (2008).

Muthukumar et al., "Selective MOCVD Growth of ZnO Nanotips", IEEE Transactions on Nanotechnology, vol. 2, No. 1 (2003).

\* cited by examiner

METHOD AND APPARATUS FOR REMOVING CONTAMINANT FROM FLUID

FIELD

The presently disclosed subject matter relates to methods and apparatus for removing contaminants from fluids, such as petrochemical and chemical gas streams.

BACKGROUND

In many petrochemical and chemical processes, removal of contaminant provides process control and ensures compliance with environmental regulations. For example, syngas generated by gasification of coal or biomass, natural gases, gases generated from petroleum refining and processing can contain harmful and toxic gases such as $H_2S$, COS, etc., which need be removed to control catalyst poisoning in the downstream processing and for regulatory compliance. In general, this removal is carried out by adsorbing the contaminant on the surface of sorbent materials in reactors, such as fluidized bed or moving bed reactors. In these reactors, the sorbent materials are normally in the form of pellets of sizes on the order of a few hundred microns to few thousand microns. To achieve an adequate removal capacity, sorbent materials with high surface area are normally used. For example, for the removal of $H_2S$ from a gas stream by adsorption, various porous materials such as activated carbon, modified clay, or modified zeolites have been used.

However, the available adsorption sites of the sorbent materials in a fluidized bed reactor or a fixed bed reactor are predominately located on the internal surfaces of the pellets. With this approach the gases must diffuse into the internal porosities of the pellets, which in turn, limits the removal rate. In addition, due to the interaction of gases with the internal surfaces and repeated expansion and contraction of the pellets in adsorption-regeneration cycles, the pellets become physically unstable. Due to this physical instability, the pellets can lose integrity, i.e., break apart mechanically, causing costly clean up and lost materials. To keep the operation running efficiently, new sorbent pellets must be added to the system and the disintegrated pellets must be removed from the reactors. Therefore, the current gas cleanup techniques suffer from this costly drawback arising from the aggregate forms of the absorbent materials used.

U.S. Pat. No. 5,494,880 describes the preparation of pellets with improved physical stability using a mixture of sorbent oxide, such as ZnO, a stabilizing amount of an inert refractory oxide and porous silica, held together with binders. However, the use of large amounts of materials other than the active sorbents can reduce the absorbing efficiency.

Recent developments in the removal of contaminant have involved utilizing nanostructures of absorbent materials. For example, Lee et al. ("Desulfurization Using ZnO Nanostructure Prepared by Matrix Assisted Method" Korean J. Chem. Eng., 26(2), 582-586) describes purported methods for removing $H_2S$ by a fixed-bed reactor containing nanosized ZnO, which are synthesized by the matrix-assisted method. Wang et al. ("Low-temperature $H_2S$ Removal From Gas Streams With SBA-15 Supported ZnO Nanoparticles," Chem. Eng. J., 142 (2008) 48-55.) describes a purported mesoporous silica gel SBA-15 functionalized by ZnO nanoparticle for $H_2S$ removal from a gas stream. U.S. Patent Application Publication No. 20090114093 describes desulfurization of warm fuel gases by metal-based sorbents attached to a porous substrate. In addition, Sayyadnejad et al. ("Removal of Hydrogen Sulfide by Zinc Oxide Nanoparticles in Drilling Fluid" Int. J. Environ. Sci. Tech., 5(4), 565-569, 2008) describes purported removal of $H_2S$ gas in drilling fluid by ZnO nanoparticles prepared by spray pyrolysis. The disclosure of each of these publications is incorporated herein by reference in its entirety.

As such, there is a need for methods and apparatus that overcome the drawbacks of the existing technologies and remove contaminant in a more efficient and economical manner.

SUMMARY

The disclosed subject matter provides methods, apparatus, and systems for removing contaminant in a fluid (e.g., chemical and petrochemical gas streams) using nanostructures of a sorbent material, such as ZnO nanostructures. The nanostructures of the sorbent materials are prepared, for example, as a thin coating on one or more plates. Such coated plates can be mounted closely, and in one particular embodiment, substantial parallel to each other, thereby forming channels between the plates for the fluid to flow through. The plate-supported nanostructures provide sorption sites substantially located on the exposed surface of the aggregation of the nanostructures for removing the contaminant, for example $H_2S$, in a fluid passing across the surface of the plates. After sorption, the nanostructures can be regenerated using heat or other methods.

In accordance with another aspect of the disclosed subject matter, a sorbent structure to remove contaminant from a fluid is provided. The sorption structure includes a vessel having an inlet and an outlet, the vessel defining a chamber therein, and a plurality of plates disposed within the vessel between the inlet and the outlet. The plurality of plates are arranged in spaced relationship to define at least one channel therebetween, in which at least one plate has a surface coated with nanostructures of a sorbent material for sorption of contaminant from fluid passing through the at least one channel across the surface of the at least one plate.

In yet another aspect of the disclosed subject matter, a sorption system is provided to remove contaminant from a petrochemical fluid. The sorption system includes a feed of petrochemical fluid containing a contaminant; a sorption structure fluidly coupled to the feed of petrochemical fluid. The sorption structure includes an inlet to receive the feed of petrochemical fluid and at least one plate having a surface coated with nanostructures of a sorbent material. The contaminant in the petrochemical fluid is subject to sorption by the sorbent material. An outlet is provided a discharge of the petrochemical fluid after passing across the surface of the plate, wherein the petrochemical fluid has a reduced amount of contaminant after passing across the surface of the plate.

The methods, sorption structure and systems provided herein will be described in conjunction with each other for purpose of understanding and enablement.

The contaminant removal approach disclosed herein utilizes nanostructures with high external surface area and an intrinsically low diffusion time, which allows high fluid flow rate and high processing capacity. In one embodiment, the nanostructures are tightly aggregated structures forming a compact layer on a substrate that has very low amount of inter-particle spaces (or pores) to allow a fluid to diffuse therein. In such a case, the sorption of contaminant occurs predominantly at the external or exposed surface of the compact layer. Using external surface area as the sorption site also eliminates the physical instability that exists with pellets used in many reactors today.

The various features and the advantages of the disclosed subject matter are described herein and will become readily apparent to those skilled in the art from the following detailed description, including the accompanied figures as well as the claims.

DETAILED DESCRIPTION

In accordance with one aspect of the disclosed subject matter, a method of removing contaminant from a fluid is provided. The method includes introducing a feed of fluid to a sorption structure, wherein the sorption structure includes at least one plate having a surface coated with nanostructures of a sorbent material, wherein the fluid containing a contaminant is subject to sorption by the sorbent material. The method further includes passing the fluid across the surface of the plate for sorption of the contaminant by the sorbent material, wherein the fluid has a reduced amount of contaminant after passing across the surface of the plate, and discharging the fluid from the sorption structure after passing across the surface of the plate. The sorption structure can further include a vessel that houses the at least one plate, where the vessel includes an inlet and outlet.

Figure 1:
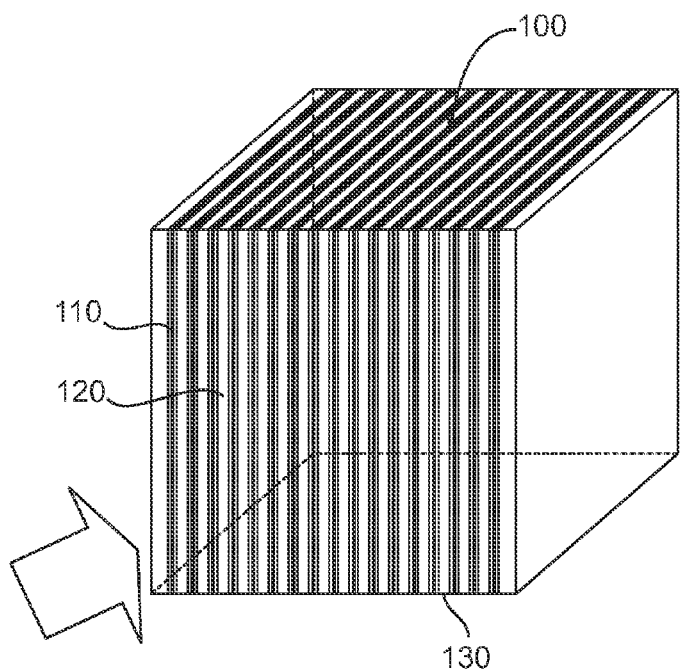
FIG. 1 illustrates a perspective view of an exemplary configuration of a sorption structure including a plurality of nanostructure-coated plates according to one embodiment of the disclosed subject matter.

FIG. 1 illustrates an exemplary configuration of a sorption structure including plurality of nanostructure-coated plates according to one embodiment of the disclosed subject matter. The sorption structure 100 includes a plurality of generally planar plates 110 that are coated with nanostructures of a sorbent material. The plates are arranged in a substantially parallel fashion, forming gaps or channels 120. A frame 130 is used to support the plurality of the plates. A feed of fluid 140, which contains a contaminant subject to sorption by the sorbent material, is introduced to the sorption structure 100, e.g., via an inlet. As the feed of fluid is directed to pass through the channels 120 and across the surface of the sorbent material-coated plates 110, at least a portion of the contaminant is removed by the sorbent material. Thereafter, the fluid is discharged, e.g., via an outlet, wherein the amount of contaminant in the fluid is reduced.

The fluid that is subject to removal of contaminants can be a chemical or petrochemical gas process stream. It is contemplated that the method and system according to the present invention are suitable for use with various process streams. For example, the method and system according to the present invention may be used as a desulfurization approach for a gas stream. The gas steam may include, but is not limited to, coal gases, flue gases, methanol synthesis gas, $H_2/N_2$ mixture, carbon monoxide and natural gas. The method and system may be used to remove contaminants such as sulfur compounds such as, but not limited to, carbonyl sulfide (COS), carbon disulfide ($CS_2$), hydrogen sulfide ($H_2S$) and mercaptan.

As used herein, the term "contaminant" refers to a substance to be removed from a fluid subject to treatment of the methods of the disclosed subject matter. The contaminant can include, for example, $H_2S$, $CS_2$, carbonyl sulfide gases, mercaptain, etc. The concentration of the contaminant in the fluid to be treated can be on the order of hundreds of ppm or less. The present invention may be effective in treating higher amounts of contaminant in the fluid to be treated.

The sorbent material used for removing the contaminant can be selected based on the contaminant. Various types of sorption mechanisms between the sorbent material and the contaminant can be used. For example, the sorbent material can include metals, metal alloys, or metal oxides. In some embodiments, the sorption of the contaminant is based on an acid-base reaction. In one specific embodiment, the sorption nanostructures include ZnO nanostructures, which are particularly useful for adsorbing $H_2S$ due to the large equilibrium constant of the chemical reaction between ZnO and $H_2S$ at low temperature. The ZnO and $H_2S$ react to form ZnS and $H_2O$.

The nanostructures of the disclosed subject matter are prepared as a coating on a substrate plate. As embodied herein and by way of example, the substrate is a non-porous solid material. For example and not limitation, the nanostructures can be fabricated using chemical vapor deposition (CVD) or metal organic chemical vapor deposition (MOCVD) on a substrate silicon wafer. The MOCVD process is described, for example, in greater detail in U.S. Pat. No. 6,710,515 to Lu et al., entitled "Integrated Tunable Surface Acoustic Wave Technology and Sensors Provided Thereby," which is incorporated herein in its entirety by reference. It is contemplated that the silicon wafer can be use as a plate 110 or it can be attached to another substrate or plate to form plate 110. The thickness of wafer is less than 2 mm and preferably less than 1 mm. The thickness of the plate is preferably less than 2 mm. Other suitable plates for growing the nano-structures are glass and sapphire.

Figure 2:
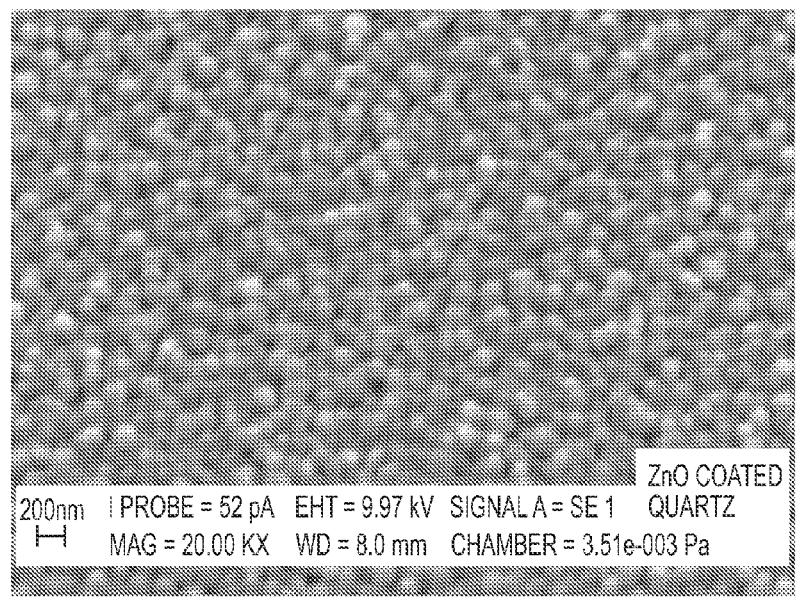
FIG. 2 is a microscope image of the nanostructures of ZnO for contaminant removal according to one embodiment of the disclosed subject matter.
Figure 3:
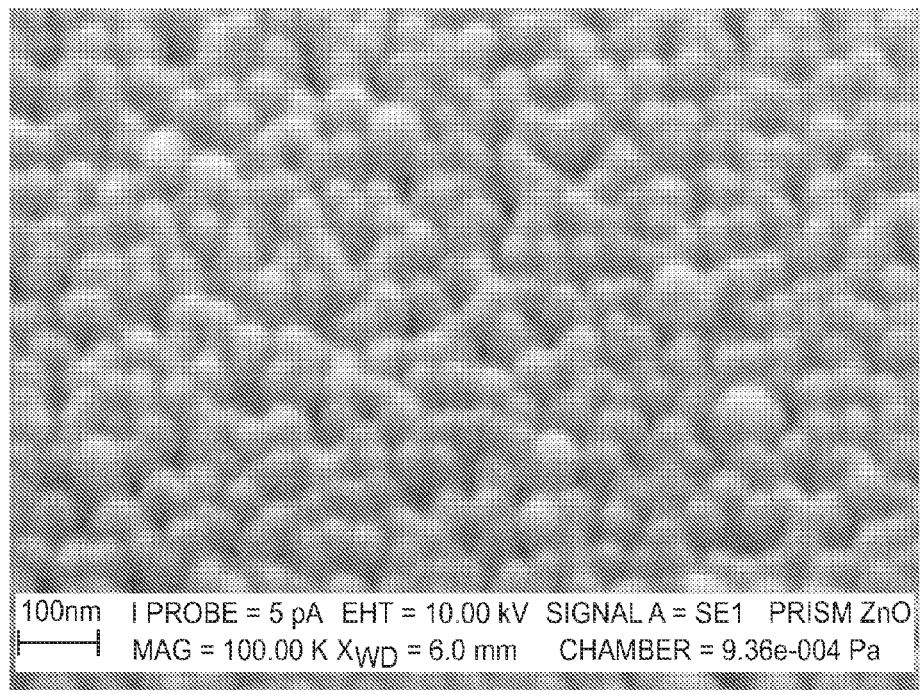
FIG. 3 is a microscope image of the nanostructures of ZnO having a columnar structure for contaminant removal according to one embodiment of the disclosed subject matter.

FIG. 2 is an exemplary electronic microscope image of ZnO nanostructures coated on a silicon wafer (top-view) in accordance with aspects of the present invention, prepared by MOCVD. The nanostructures are preferably formed as nanotips having a structure as disclosed, for example, in Muthukumar et al., "Selective MOCVD Growth of ZnO Nanotips", IEEE Transactions on Nanotechnology, Vol 2., No. 1, March 2003, which is incorporated herein in its entirety by reference. The nanostructures coated on the plate can have a thickness of less than about 1000 nm, and more particularly, between 800 nm to about 50 nm. The nanostructures have an average diameter of less than about 100 nm. These nanostructures may have a columnar structure (as shown in FIG. 3), a spherical structure or any other geometry that is capable of being formed or deposited on a flat surface. Unlike coated hollow pellets, these structures have internal hidden surfaces. These internal hidden surfaces may lead to physical instability. The physical and chemical reactions of gases with the internal surface cause a physical instability of the pellets resulting in pellet's breaking apart, which adversely impacts performance. In particular, the gases cause expansion of the pellet which causes the pellet's to break apart.

Referring back to FIG. 1, the plurality of plates can be arranged in a spaced relationship to each other, e.g., at an average distance of about 100 nm to about 1 mm and preferably 1000 nm between the opposing surfaces of adjacent plates. The surface area of one of the plates (without a coating of nanostructures) can be from about 1 cm$^2$ and about 5000 cm$^2$. The provision of the nanostructures can dramatically increase the reactive surface area of the plates. In particular, surface area of the plate with nanostructures can be 2 to 100 times greater than the surface area of the plate without nanostructures.

Figure 4:
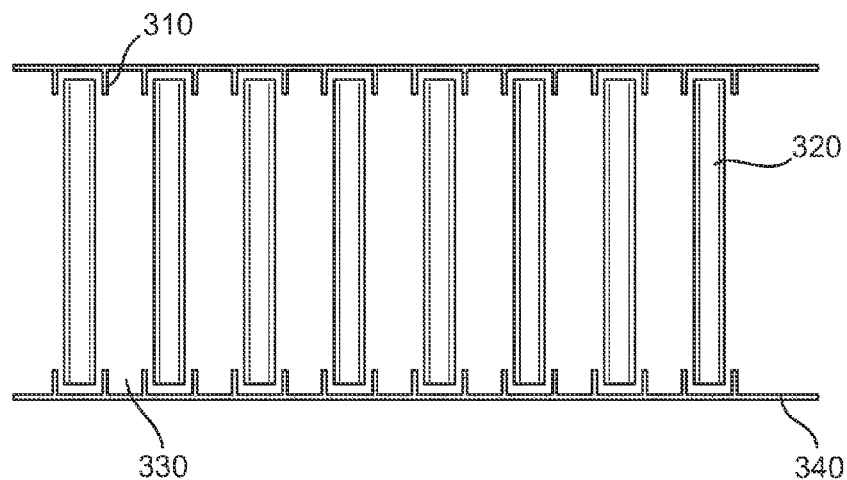
FIG. 4 illustrates an enlarged side view of the sorption structure illustrated in FIG. 1 according to one embodiment of the disclosed subject matter.
Figure 5:
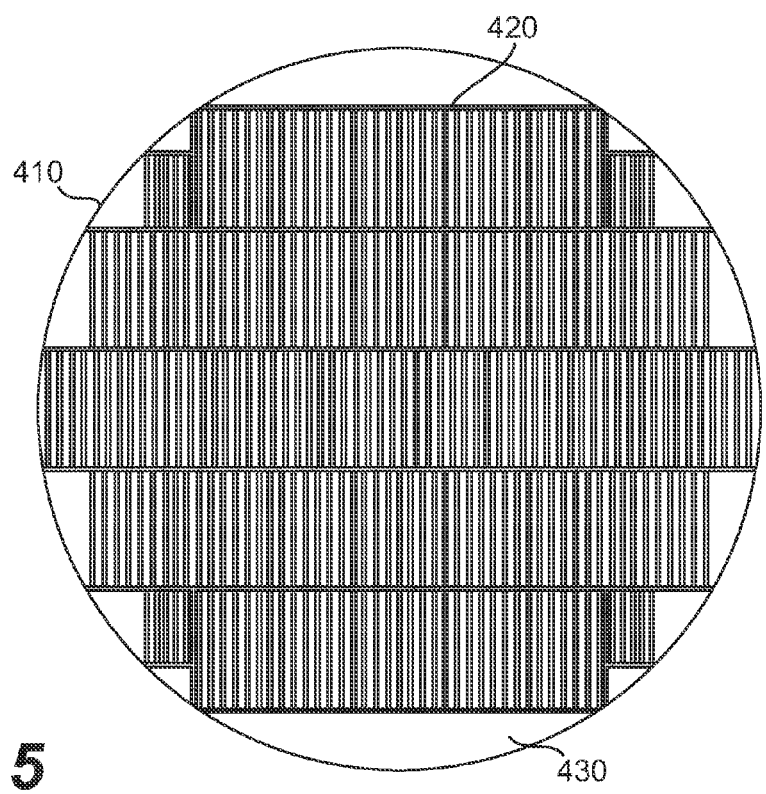
FIG. 5 illustrates a top view of another exemplary configuration of a sorption structure including a plurality of nanostructure-coated plates according to one embodiment of the disclosed subject matter.

FIG. 4 illustrates an enlarged side view of the sorption structure illustrated in FIG. 1, which is arranged in an overall cubic shape with a rectangular cross section. The plurality of coated plates 320 are mounted on the holders 310, which are installed on the support frame 330, forming channels 340 between adjacent plates. The present invention is not intended to be limited to the arrangement shown in FIG. 1; rather, other arrangements of the spaced plates are suitable provided the plates are arranged such that the reactive gas can flow over or across the plates such that the gas stream contacts the nanostructures. For example, the sorption structure can be arranged in an overall cylindrical structure, with a circular cross-section, as shown in FIG. 5. This structure includes a combination of a plurality of structures, such as illustrated in FIG. 1, with varying sizes within the determined space. The diameter of the cylinder can be selected to fit in conventional or existing flow tubes for transporting the fluid, e.g., gas flow tubes for retrofit purposes. The cylinder can be divided into several portions in the diameter direction, each of the portions being fitted with plate support frames 420, on which a plurality of nanoparticles-coated plates are mounted. The plurality of plates can have a number of different sizes, depending the locations in which they are mounted. In turn, the plate support frames 420 are installed on the cylindrical wall 410. The empty areas such as 430 in FIG. 4 can be filled with smaller size plates.

For purpose of illustration and not limitation, reference is made to certain parameters of a representative embodiment of the method and system. For example, the fluid is a gas stream and the contaminant is $H_2S$, and the sorption occurs as adsorption at a temperature between about 10° C. and about 90° C. and a pressure between about 15 psig and about 1500 psig. The flow rate of the gas will vary based upon the size of the sorption structure. Lower flow rates are required for smaller sorption structures, while higher flow rates can be employed for larger sorption structures. The flow rate is determined such that the gas has similar contact times with the nanostructures. The present invention may result in a significant reduction in $H_2S$ content. The discharged gas containing 10 ppb of $H_2S$ as compared with the feed gas containing 100 ppm of $H_2S$.

The sorption sites of the sorbent material can be depleted after prolonged use for removing contaminants, and the sorbent material can turn into an inert compound no longer reactive to the contaminant. To reuse the sorbent material, the plates coated with nanoparticles can be regenerated to the original sorbent material. For example and with reference to the embodiment herein, ZnO nanoparticles will convert to ZnS after adsorbing $H_2S$. The ZnS nanoparticles can be heated in a temperature range of 500-1000° C. in air or an oxygen rich atmosphere to revert back to ZnO nanoparticles, accompanied by the release of $SO_2$ gas, which can be collected or absorbed by suitable media, e.g., a basic solution.

While various embodiments of the disclosed subject matter are shown and described, it is to be understood that the invention is not limited thereto and may be variously embodied to practice within the scope of the following claims. It will be apparent to those skilled in the art that various changes may be made without departing from the spirit and scope of the invention as defined by the following claims.

The invention claimed is:

1. A method of removing contaminants from a fluid, comprising:
    introducing a feed of fluid to a sorption structure, the sorption structure including at least one plate having a surface coated with nanostructures of a sorbent material, wherein the sorbent material is a metal oxide, the fluid containing a contaminant subject to sorption by the sorbent material;
    passing the fluid across the surface of the plate for sorption of the contaminant by the sorbent material, the fluid having a reduced amount of contaminant after passing across the surface of the plate; and
    discharging the fluid from the sorption structure after passing across the surface of the plate.

2. The method of claim 1, wherein the sorption structure includes a plurality of plates in spaced relationship defining at least one channel therebetween, and further wherein passing the fluid across the surface includes directing the fluid through the at least one channel.

3. The method of claim 2, wherein the plurality of plates have generally planar configurations.

4. The method of claim 2, wherein adjacent plates are arranged substantially in parallel.

5. The method of claim 1, wherein the plates have a number of different sizes.

6. The method of claim 1, wherein the metal oxide is ZnO.

7. The method of claim 1, wherein the nanostructures as coated on the plate have a thickness of less than about 800 nm.

8. The method of claim 1, wherein the nanostructures have an average diameter of less than about 100 nm.

9. The method of claim 1, further comprising regenerating the sorbent material by heating the used sorbent material.

10. The method of claim 1, wherein the sorption structure further includes a vessel housing the at least one plate, the vessel including an inlet and outlet.

11. A method of removing contaminants from a fluid, comprising:
    introducing a feed of fluid to a sorption structure, the sorption structure including at least one plate having a surface coated with nanostructures of a sorbent material, wherein the plate is formed of silicon, the fluid containing a contaminant subject to sorption by the sorbent material;
    passing the fluid across the surface of the plate for sorption of the contaminant by the sorbent material, the fluid having a reduced amount of contaminant after passing across the surface of the plate; and
    discharging the fluid from the sorption structure after passing across the surface of the plate.

12. A method of removing contaminants from a fluid, comprising:
    introducing a feed of fluid to a sorption structure, the sorption structure including at least one plate having a surface coated with nanostructures of a sorbent material, wherein the nanostructures are coated on the plate by chemical vapor deposition, the fluid containing a contaminant subject to sorption by the sorbent material;
    passing the fluid across the surface of the plate for sorption of the contaminant by the sorbent material, the fluid having a reduced amount of contaminant after passing across the surface of the plate; and
    discharging the fluid from the sorption structure after passing across the surface of the plate.

13. A method of removing contaminants from a fluid, comprising:
introducing a feed of fluid to a sorption structure, the sorption structure including at least one plate having a surface coated with nanostructures of a sorbent material, the fluid containing a contaminant subject to sorption by the sorbent material, wherein the fluid is a petrochemical gas;
passing the fluid across the surface of the plate for sorption of the contaminant by the sorbent material, the fluid having a reduced amount of contaminant after passing across the surface of the plate; and
discharging the fluid from the sorption structure after passing across the surface of the plate.

14. The method of claim 13, wherein the sorption structure includes a plurality of plates in spaced relationship defining at least one channel therebetween, and further wherein passing the fluid across the surface includes directing the fluid through the at least one channel.

15. The method of claim 13, wherein the plates have a number of different sizes.

16. The method of claim 13, wherein the nanostructures as coated on the plate have a thickness of less than about 700 nm.

17. The method of claim 13, wherein the nanostructures have an average diameter of less than about 100 nm.

18. The method of claim 13, further comprising regenerating the sorbent material by heating the used sorbent material.

19. A method of removing contaminants from a fluid, comprising:
introducing a feed of fluid to a sorption structure, the sorption structure including at least one plate having a surface coated with nanostructures of a sorbent material, the fluid containing a contaminant subject to sorption by the sorbent material, wherein the contaminant includes hydrogen sulfide;
passing the fluid across the surface of the plate for sorption of the contaminant by the sorbent material, the fluid having a reduced amount of contaminant after passing across the surface of the plate; and
discharging the fluid from the sorption structure after passing across the surface of the plate.

20. The method of claim 19, wherein the sorption structure includes a plurality of plates in spaced relationship defining at least one channel therebetween, and further wherein passing the fluid across the surface includes directing the fluid through the at least one channel.

21. The method of claim 19, wherein the plates have a number of different sizes.

22. The method of claim 19, wherein the nanostructures as coated on the plate have a thickness of less than about 700 nm.

23. The method of claim 19, wherein the nanostructures have an average diameter of less than about 100 nm.

24. The method of claim 19, further comprising regenerating the sorbent material by heating the used sorbent material.

25. A method of removing contaminants from a fluid, comprising:
introducing a feed of fluid to a sorption structure, the sorption structure including at least one plate having a surface coated with nanostructures of a sorbent material, the fluid containing a contaminant subject to sorption by the sorbent material;
passing the fluid across the surface of the plate for sorption of the contaminant by the sorbent material, the fluid having a reduced amount of contaminant after passing across the surface of the plate, wherein sorption of the contaminant with the sorbent material is based on an acid-base reaction; and
discharging the fluid from the sorption structure after passing across the surface of the plate.

26. The method of claim 25, wherein the sorption structure includes a plurality of plates in spaced relationship defining at least one channel therebetween, and further wherein passing the fluid across the surface includes directing the fluid through the at least one channel.

27. The method of claim 25, wherein the plates have a number of different sizes.

28. The method of claim 25, wherein the nanostructures as coated on the plate have a thickness of less than about 700 nm.

29. The method of claim 25, wherein the nanostructures have an average diameter of less than about 100 nm.

30. The method of claim 25, further comprising regenerating the sorbent material by heating the used sorbent material.

31. A sorption structure to remove contaminant from a fluid, comprising:
a vessel having an inlet and an outlet, the vessel defining a chamber therein; and
a plurality of plates disposed within the vessel between the inlet and the outlet, the plurality of plates arranged in spaced relationship to define at least one channel therebetween, at least one plate having a surface coated with nanostructures of a sorbent material for sorption of contaminant from fluid passing through the at least one channel across the surface of the at least one plate, wherein the sorbent material is a metal oxide.

32. A sorption system to remove contaminant from a petrochemical fluid, comprising:
a feed of petrochemical fluid containing a contaminant;
a sorption structure fluidly coupled to the feed of petrochemical fluid, the sorption structure including an inlet to receive the feed of petrochemical fluid and at least one plate having a surface coated with nanostructures of a sorbent material, the contaminant in the petrochemical fluid subject to sorption by the sorbent material, the sorption structure further including an outlet; and
a discharge fluidly coupled with the outlet of the sorption structure to receive the petrochemical fluid after passing across the surface of the plate, the petrochemical fluid having a reduced amount of contaminant after passing across the surface of the plate.

* * * * *